UNITED STATES PATENT OFFICE.

PAUL PICKL, OF CHICAGO, ILLINOIS, ASSIGNOR TO EMMA PICKL, OF CHICAGO, ILLINOIS.

METHOD OF MAKING A HARD-RUBBER SUBSTITUTE AND THE PRODUCT THEREOF.

1,265,108.

Specification of Letters Patent. Patented May 7, 1918.

No Drawing. Application filed April 23, 1917. Serial No. 163,883.

*To all whom it may concern:*

Be it known that I, PAUL PICKL, a citizen of Switzerland, residing at Chicago, in the county of Cook, State of Illinois, have invented a new and useful Improvement in Methods of Making a Hard-Rubber Substitute and the Product Thereof, of which the following is a specification.

This invention relates to a method of making a rubber substitute and to a composition of matter produced by this new method.

An object of the invention is to provide a method for producing a new composition which to all appearances and qualities is the equivalent of ordinary hard vulcanizable rubber, and the invention furthermore has an object to utilize for this purpose a mineral which has not been utilized before.

Another object of the invention is to subject this mineral to a treatment whereby owing to substances added thereto, vulcanization may be effected.

In order to carry out the invention a natural, somewhat bituminous vulcanizable hydrocarbon in mineral form, elaterite, is used. This mineral is found in the southern part of England and in other parts of the world. This mineral is not soluble in water or alcohol. It has relatively high resistance against lyes and acids and contains in the condition in which it is found perceptible portions of sulfur fluctuating from two to five per cent. by weight. In order to convert this mineral by addition of suitable substances into a novel composition, it is ground up to pulverized condition and mixed, after grinding, with a small amount of pitch or with a small amount of rubber, rosin, asphalt or gilsonite. To this mixture consisting of pulverized mineral hydrocarbon and other bituminous or resinous material, a small amount of sulfur, from two to three per cent., is added to make the novel composition as readily vulcanizable as ordinary rubber.

In order to effect vulcanization the mixture consisting of elaterite and one or more of the above ingredients to which the sulfur has been added is subjected to heat, preferably after it has been inserted into suitable molds corresponding to the shape which the finished article of the new composition shall have. The vulcanization furthermore is carried out while pressure is exerted on the mass, this pressure being from 150 atmospheres to 300. The temperature at which the vulcanization may be carried out may be the same temperature at which vulcanization of rubber article takes place.

The finished product has all the qualities of ordinary hard rubber with approximately the same degree of resiliency and ability to resist the influence of water or alcohol.

I claim:

1. A method of making a hard rubber substitute which consists of grinding elaterite containing sulfur, adding a resinous substance to the same, and subjecting the mixture to heat.

2. A method of making a hard rubber substitute which consists of grinding elaterite, adding three to five per cent. of ground resinous substance to the same, and subjecting the mixture to heat.

3. A method of making a hard rubber substitute which consists of grinding elaterite, adding to the ground mineral a resinous mineral, adding to this mixture of elaterite and resinous mineral sulfur, and subjecting the new mixture to heat and pressure.

4. A method of making artificial rubber which consists of grinding elaterite to pulverized condition, adding to this ground elaterite three to five per cent. of resinous material and two to three per cent. of sulfur, subjecting the mixture to heat and to a pressure of between 150 and 300 atmospheres.

5. A rubber substitute consisting of natural elaterite combined with resinous material and sulfur.

6. A rubber substitute consisting of over 90 per cent. elaterite, three to five per cent. of resinous material and two to three per cent. of sulfur added to the natural sulfur contents of the elaterite.

PAUL PICKL.